United States Patent [19]

Limb et al.

[11] 3,803,348

[45] Apr. 9, 1974

[54] METHOD AND APPARATUS FOR ENCODING COLOR VIDEO SIGNALS

[75] Inventors: John Ormond Limb, New Shrewsbury; Charles Benjamin Rubinstein, Colts Neck, both of N.J.

[73] Assignee: Bell Telephone Laboratories, Incorporated, Murray Hill, N.Y.J

[22] Filed: Jan. 22, 1973

[21] Appl. No.: 325,603

[52] U.S. Cl......... 178/5.4 R, 178/5.2 R, 178/DIG. 3

[51] Int. Cl................................................. H04r 9/02

[58] Field of Search.......... 178/5.2 R, 5.4 R, DIG. 3

[56] References Cited

UNITED STATES PATENTS 3,720,780 3/1973 Remy et al....................... 178/5.2 R

*Primary Examiner*—Robert L. Richardson

*Attorney, Agent, or Firm*—D. D. Bubosky

[57] ABSTRACT

The luminance and two chrominance signals generated in a color video system are all translated into digital words by a plurality of analog-to-digital encoders. A decision circuit develops a word-to-word difference for the luminance signal and compares this difference to a threshold level. In response to a difference which exceeds the threshold level, an average value for each of the chrominance signals is developed until the threshold is exceeded again at which time it is coupled into an auxiliary buffer memory. A digital transmitter couples the luminance digital words to a transmission channel except during the horizontal sync interval when the average values for the chrominance signals are coupled to the transmission channel. In the receiving decoder, an identical decision circuit responds to the luminance signal in combination with the average values for the chrominance signal in the development of the two chrominance signals.

12 Claims, 2 Drawing Figures

METHOD AND APPARATUS FOR ENCODING COLOR VIDEO SIGNALS

BACKGROUND OF THE INVENTION

This invention relates to video signal processing circuits and, more particularly, to a digital processing circuit for use with the chrominance signals which are developed in a color video system.

It is common practice in the transmission of color television signals to use a lower bandwidth for the chrominance signals than for the luminance signal. The signals are packaged together such that the luminance signal is baseband and the two chrominance signals are modulated onto a carrier. The exact form of the composite signal is different in the NTSC, SECAM, and PAL systems, as is the frequency characteristic, but each system makes use of the fact that the bandwidth content of the chrominance signals may be reduced over that of the luminance signal.

In the relatively new field of digital coding of color signals for transmission, one approach has been to code separately the luminance and chrominance signals. This has been shown to have certain advantages over coding a composite signal. However, what has not been appreciated and/or exploited heretofore is the fact that amplitude errors can be made in the chrominance signals without a corresponding deleterious effect in the displayed color picture. This is a separate and distinct effect from the commonly employed chrominance-signal frequency-reduction technique.

SUMMARY OF THE INVENTION

A primary object of the present invention is to reduce the number of bits which must be utilized in the transmission of color information in a color video signal. Another object is to reduce the number of required bits by exploiting the above-mentioned phenomenon relating to amplitude errors in the chrominance signals without producing a deleterious effect in the display picture.

These and other objectives are achieved in accordance with the present invention wherein the luminance and chrominance signals are sampled and converted into digital form and new chrominance information is transmitted only when the luminance signal in some sense exceeds a threshold level. The threshold level can be related either to the size of the difference between successive picture elements along a video line or can be related to a function of the amplitudes of samples taken both vertically and horizontally in the spatial format of picture elements, or to a function of the amplitudes of samples taken vertically, horizontally, and temporally if one is coding a sequence of pictures. Any one of a number of processing techniques commonly employed in the encoding of monochrome signals can be utilized to determine this threshold criteria. New chrominance information is transmitted only when the luminance threshold is exceeded, thereby resulting in the production of plateaus of constant chrominance levels in the receiving decoder.

In accordance with the embodiment which is shown, the element-to-element differences for successive picture elements in a video line are established in a decision circuit. These differences are compared to a threshold level. If a difference exceeds the threshold level, the decision circuit produces an energizing signal. The digital words representing the chrominance information in each of the chrominance signals are added in an accumulator circuit. The sum obtained in each accumulator circuit is divided in response to an output from the decision circuit by the number of digital words which have been accumulated since the preceding output from the decision circuit. Accordingly, the divider provides an average value for each of the chrominance signals between successive outputs from the decision circuit. Each of the average values is coupled to the input of an auxiliary buffer memory which stores these values until the horizontal sync interval, during which interval they are coupled to the digital transmitter. In the receiving decoder, an identical decision circuit responds to the digital words representing the luminance values in order to produce energizing signals which represent the locations of chrominance transitions within the video line. The chrominance digital values are stored in a receiving auxiliary buffer memory and are read out from this memory in response to each of the outputs from the receiving decision circuit. Digital-to-analog converters connected to the output of the receiving auxiliary buffer memory convert the chrominance plateaus established at the output of the memory into analog chrominance signals.

BRIEF DESCRIPTION OF THE DRAWINGS

The invention will be more readily understood after reading the following detailed description taken in conjunction with the drawings, in which.

DETAILED DESCRIPTION

Figure 1:
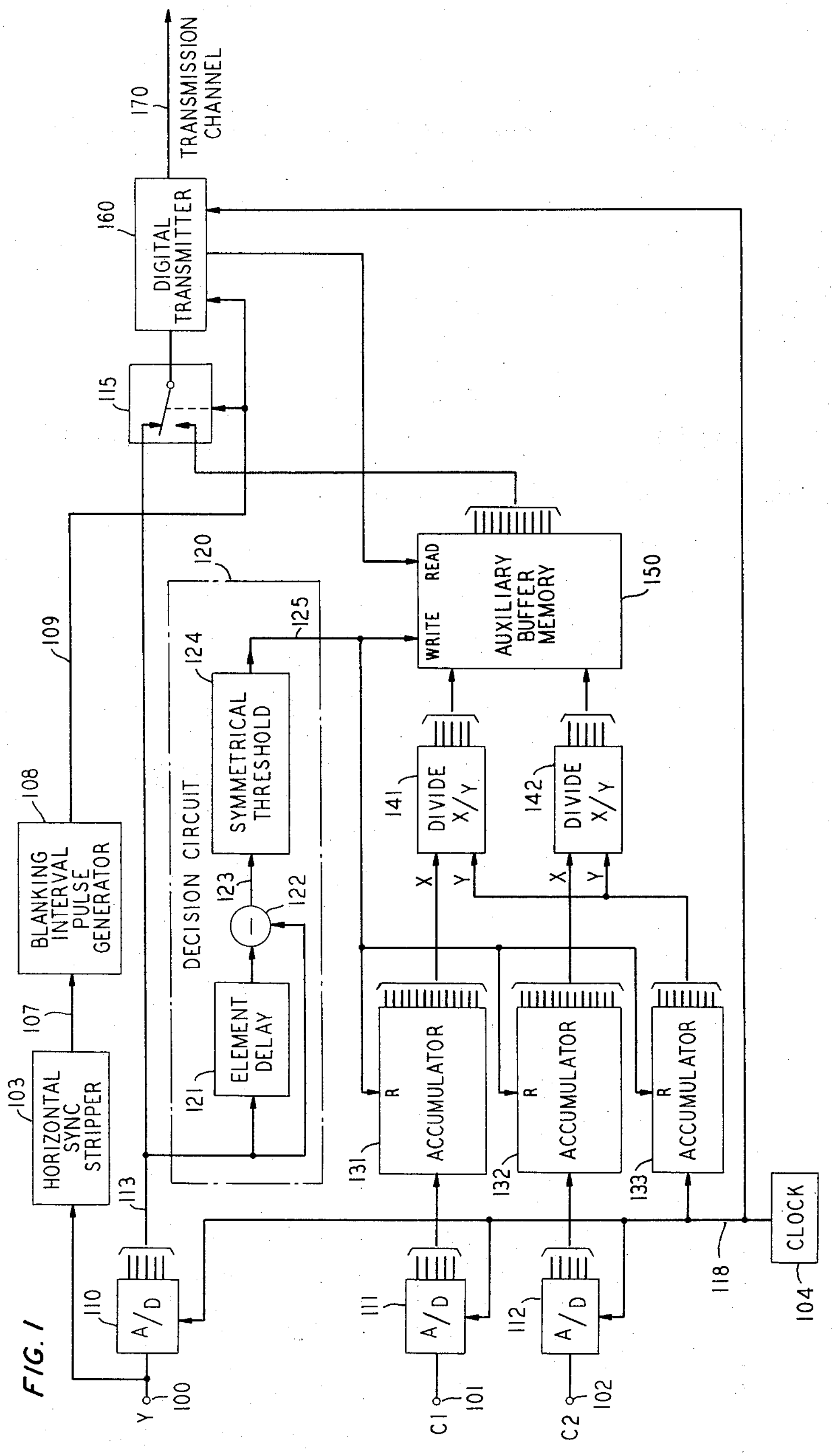
FIG. 1 is a schematic block diagram of a digital encoder constructed in accordance with the present invention.

In FIG. 1, the luminance and two baseband chrominance signals of the type generated in an NTSC video system are coupled to input terminals 100, 101 and 102. The luminance signal at terminal 100 is coupled both to the input of an analog-to-digital encoder 110 and to the input of a horizontal sync stripper 103. The chrominance signal at input terminal 101 and the chrominance signal at input terminal 102 are coupled to the inputs of analog-to-digital converters 111 and 112, respectively. A clock generator 104 provides energizing pulses to the control inputs of each of the analog-to-digital converters 110, 111 and 112. In response to a pulse from clock generator 104, each of the analog-to-digital converters samples the analog signal provided at its input and develops a digital word at its output the value of which represents the amplitude of the sample. The pulses from clock generator 104 occur at a sufficiently rapid rate such that digital words are produced at the output of analog-to-digital converter 110 for each of the picture elements within a video line.

In a video telephone system where the bandwidth may be in the order of one megahertz, a pulse rate of 2 megahertz is provided by clock generator 104. These pulses from generator 104 also cause analog-to-digital converters 111 and 112 to develop digital words at their respective outputs which represent the sampled amplitudes of their respective chrominance signals. The rate at which these chrominance digital words are developed can be much reduced in view of the lower frequency content in the chrominance signals but, as will be appreciated by those skilled in the art after a more thorough understanding of the present invention, this reduction in pulse rate is not necessary since all of the digital information developed by converters 111 and 112 is not coupled through to the transmission channel.

Each digital word developed by the analog-to-digital converter 110 is coupled to the input of a decision circuit 120. In decision circuit 120, the digital words from bus 113 are coupled both to the input of a delay memory 121 and also to one input of a subtraction circuit 122. Delay memory 121 provides each of the digital words at its input with a one element delay, that is, with a delay equal to the interval between successive digital words on bus 113. The output of delay memory 121 is coupled to a second input of subtraction circuit 122. Hence, subtraction circuit 122 establishes at its output on line 123 a digital word, the value of which represents the amplitude of the difference between successive digital words on bus 113.

The difference on line 123 is coupled to the input of a symmetrical threshold circuit 124. If the absolute magnitude of the difference on line 123 is less than the predetermined threshold level, threshold circuit 124 produces a logic "0" level output on line 125. If, however, the absolute magnitude of the difference on line 123 exceeds the predetermined threshold level, threshold circuit 124 produces a logic "1" level energizing pulse on line 125. In the present embodiment, where the luminance values are represented by eight bits on bus 113, thereby corresponding to 256 levels of luminance information, the threshold level in threshold circuit 124 is caused to be equal to five. Other threshold levels may also be utilized and the particular threshold level which is chosen depends primarily on the statistics of the video images normally transmitted by way of the encoder. In summary, decision circuit 120 produces an energizing pulse on line 125 in response to a change in the luminance signal which exceeds a predetermined threshold level.

The outputs of analog-to-digital converter 111 and analog-to-digital converter 112 are each coupled to the inputs of accumulator circuit 131 and accumulator circuit 132, respectively. In response to each digital word presented at their inputs, accumulator circuits 131 and 132 add the value represented by the digital word to an internally-developed summation. This summation within each of the accumulator circuits 131 and 132 is available at the output of each of the accumulator circuits. In the present embodiment, where the values for the chrominance samples are provided by five-bit digital words, each of the accumulator circuits is caused to have an output of 13 digital bits. This permits the summation of 256 chrominance values, thereby permitting a significant luminance change in each of the 256 picture elements in a video line. As will be appreciated by those skilled in the art, this number of changes in luminance information is extremely unlikely and further experimentation with the type of pictures intended to be transmitted may easily result in a reduction in the number of bits which must be provided by each of the accumulator circuits.

Each of the accumulator circuits also has a reset input which when energized causes the internal summation within the accumulator circuit to be cleared to zero. The 13-bit digital word representing the summation within each of the accumulator circuits 131 and 132 is coupled to one input of a divider circuit 141 and a divider circuit 142, respectively.

The pulses from clock generator 104, in addition to being coupled to the analog-to-digital converters, are also coupled to the input of an accumulator circuit 133. Accumulator circuit 133, like the other two accumulator circuits, has a reset input which when energized causes its internal summation to be cleared to zero. The output of accumulator circuit 133 is connected to the second input of each of the divider circuits 141 and 142. Accordingly, each of the divider circuits by being presented with the summation from its respective accumulator circuit at one input, and a number from accumulator circuit 133 at its other input representing the number of samples utilized to develop that summation, provides at its output an average value for its respective chrominance signal.

The reset inputs for accumulator circuits 131, 132 and 133 are all coupled by way of line 125 to the output of decision circuit 120. In addition, line 125 is coupled to the write input of an auxiliary buffer memory 150. In response to an energizing pulse on line 125, the average values present at the outputs of divider circuits 141 and 142 are coupled into storage within memeory 150 and the accumulator circuits 131, 132, and 133 are all reset to zero. In the present embodiment, wherein 256 picture elements are present during the active region of the video line and the horizontal blanking interval corresponds to an interval equal to 44 picture elements, auxiliary buffer memory 150 is made large enough to store 35 10-bit digital words each of which represents two five-bit digital words, one for each of the two chrominance signals. This capacity is believed to be large enough to process color signals of the type generated in a video telephone service. The capacity of buffer memory 150, however, may be increased to store more than the 35 10-bit digital words since information may be transmitted during the vertical blanking interval during which most encoders do not generate additional luminance or chrominance information. If it is determined that even this vertical blanking interval is not sufficient to accommodate the amount of information being generated, the threshold level may be increased within threshold circuit 124 or this threshold level may be caused to vary as a function of the amount of information being stored within a buffer memory of the digital transmitter.

As indicated hereinabove, a luminance signal at input terminal 100 is coupled to the input of a horizontal sync stripper 103. In response to the horizontal blanking intervals within the luminance signal at terminal 100, horizontal sync stripper 103 develops an energizing pulse at its output on line 107. This energizing pulse on line 107 causes a blanking interval pulse generator 108 to develop an energizing signal on line 109 during the horizontal blanking interval. This energizing pulse on line 109 is coupled to the control input of a switching circuit 115 and also to an input of a digital transmitter 160. Switching circuit 115, although shown in the drawings symbolically as a single-pole double-throw switch, is actually a plurality of logic AND gates which may be energized or inhibited, depending on the state of the signal present on line 109. With no energizing signal on line 109, the digital words on bus 113 representing the luminance information are coupled through switching circuit 115 to the input of digital transmitter 160. This digital transmitter 160 in turn couples these digital words presented at its input to a transmission channel 170. During the horizontal blanking interval when an energizing pulse is provided on line 109, the input of digital transmitter 160 is decoupled in switching circuit 115 from bus 113 and is instead coupled by way of switching circuit 115 to the output of the auxiliary buffer memory 150. In response to the energizing pulse on line 109, digital transmitter 160 couples read-out pulses to the read input of buffer memory 150, thereby causing this buffer memory to be emptied of all of its information during the horizontal blanking interval. Inasmuch as this type of operation causes information to be provided at the input of digital transmitter 160 at a variable rate, digital transmitter 160, in a manner well known to those skilled in the art, must utilize a buffer memory at its input to interface the variable-rate-generated information with the constant bit-rate of transmission channel 170. To synchronize both the encoder in FIG. 1 with the decoder in FIG. 2, the digital bits generated at transmission channel 170 are caused to occur at a rate which is related to the rate at which pulses are generated by clock generator 104.

In summary, the digital encoder in FIG. 1 transmits chrominance information only when a change occurs in the luminance signal. Although the specific embodiment which has been described stores the chrominance information during the active region of the video line and transmits this information during the horizontal blanking interval, it will be appreciated by those skilled in the art that chrominance information can also be transmitted by interleaving the chrominance information with the luminance information during the active region of the video line. This latter type operation may require distinctive code words to identify the chrominance information but the reduction in the number of digital bits which must be transmitted for the chrominance information will still yield an increased efficiency in operation. In the embodiment shown, digital transmitter 160 distinguishes the luminance information from the chrominance information by transmitting a single distinguishable code word at the beginning of each active region of a video line. After 256 luminance digital words, a variable number of chrominance words are presented in transmission channel 170.

Figure 2:
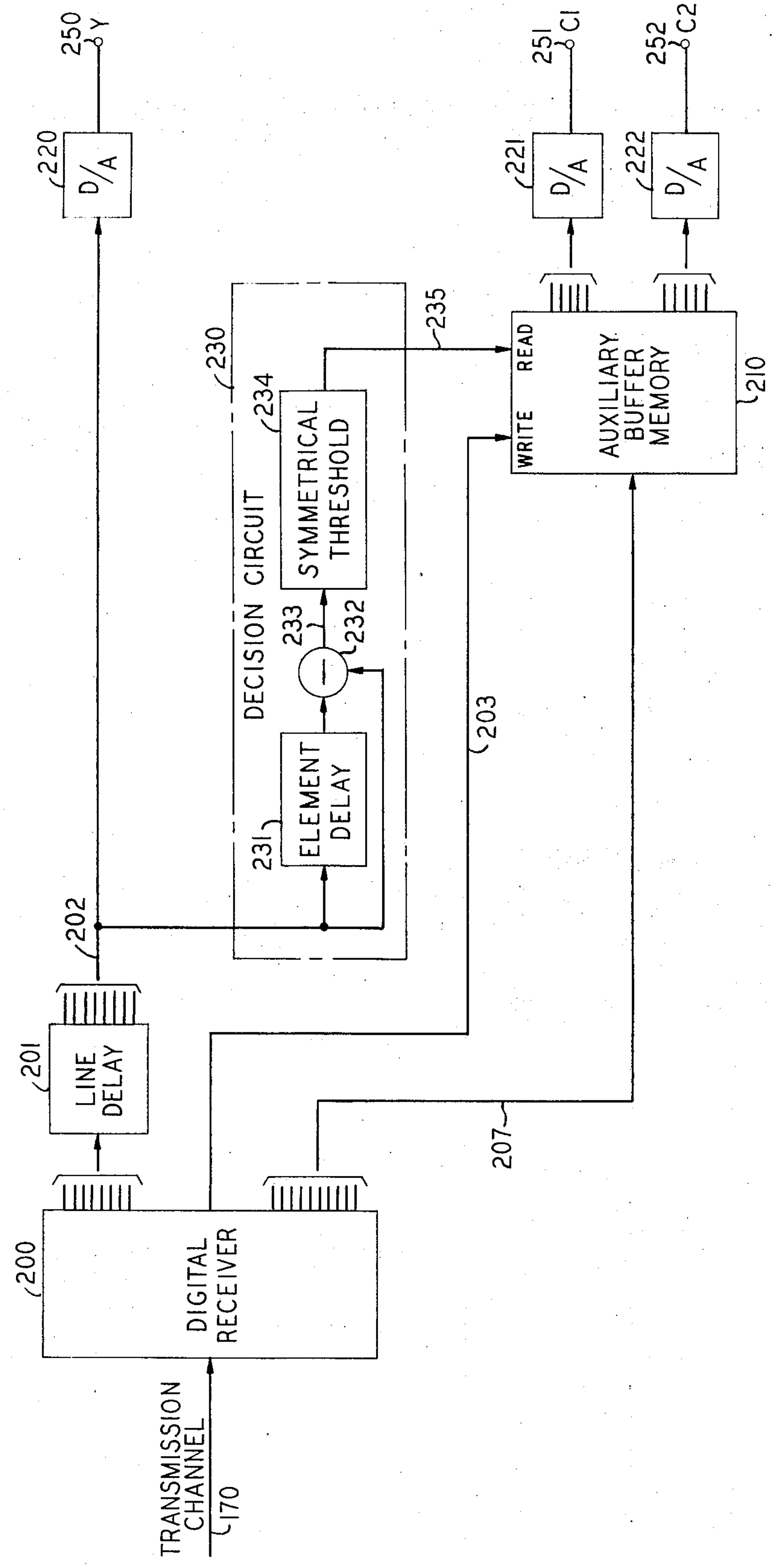
FIG. 2 is a schematic block diagram of a digital decoder constructed in accordance with the present invention.

The digital bits developed on transmission channel 170 are connected to the input of a digital receiver 200 shown in FIG. 2. In response to the distinguishable code word at the beginning of the active region of each video line, digital receiver 200 couples the next 256 eight-bit digital words to the input of a line delay memory 201. Line delay memory 201 presents a delay equal to a video line and, therefore, the digital words presented at its input appear on bus 202 at the output of delay memory 201 one video line interval after they have been coupled out of digital receiver 200. After 256 eight-bit digital words following the distinguishable code word, digital receiver 200 provides an energizing signal on line 203 at the write input of an auxiliary buffer memory 210. The energizing signal on line 203 remains present until the distinguishable code word again appears on transmission channel 170. During the interval when an energizing signal is present on line 203, 10-bit digital words (representing two five-bit chrominance values) are developed in digital receiver 200 and coupled to the input of auxiliary buffer memory 210.

As indicated hereinabove in connection with the discussion of the operation of the FIG. 1 encoder, the chrominance information for a given video line is not provided to the digital transmitter 160 until the active region of that video line has been presented to the digital transmitter. Accordingly, the chrominance information for a given video line is not coupled into auxiliary buffer memory 210 until the luminance information for that video line has been stored in line delay memory 201.

The digital words at the output of line delay memory 201 are coupled both to the input of a digital-to-analog converter 220 and to the input of a decision circuit 230 which is identical in construction to the above-mentioned decision circuit 120. In decision circuit 230, an element delay memory 231 and a subtraction circuit 232 develop differences on line 233 which represent the word-to-word differences for successive words on bus 202. In a manner identical to the operation of decision circuit 120 in FIG. 1, these differences within decision circuit 230 are compared in a symmetrical threshold circuit 234, and an energizing signal is developed on line 235 when the element-to-element or word-to-word difference exceeds the predetermined threshold level of symmetrical threshold circuit 234. As a result, energizing signals are developed on line 235 at instants during the active region of the video line which are identical to the positions in the video line during which threshold circuit 120 developed energizing signals at its output.

In response to each energizing signal on line 235, the read input of buffer memory 210 is energized and two five-bit chrominance digital words are read out of the buffer memory and two new five-bit digital words are coupled to the inputs of digital-to-analog converters 221 and 222. These digital words are read out of buffer memory 210 on a first-in-first-out basis. The digital values remain present at the output of buffer memory 210 until the next energizing pulse is coupled by way of line 235 to its read input. As a result, chrominance signals are developed by each of the digital-to-analog converters 221 and 222 from the plateaus of information which have been provided by the digital encoder in FIG. 1. The luminance signal which is present at terminal 250 at the output of digital-to-analog converter 220 may then be coupled along with the analog signals present at the outputs of digital-to-analog converters 221 and 222 to any utilization circuit.

What has been described hereinabove is a specific embodiment which utilizes and practices the present invention. Numerous modifications may be made by those skilled in the art without departing from the spirit and scope of the present invention. For example, any one of several monochrome decoders well known to those skilled in the art may be connected in the encoder to process the luminance values before they are transmitted over transmission channel 170. For example, a DPCM (differential pulse code modulation) encoder may be inserted between analog-to-digital converter 110 and the input of switching circuit 115. Since the output of this type encoder provides digital words whose values represent element-to-element differences, the output of this encoder may be directly connected to the input of a threshold circuit identical in function to that of symmetrical threshold circuit 124. The outputs of the DPCM encoder are then checked by this threshold circuit against a predetermined threshold level to develop the energizing signal which indicates when chrominance information must be transmitted to the receiving location. The utilizations of other prior art encoders may be adapted to further process either the luminance signal or the chrominance signals.

We claim:

1. A video encoder for use with a luminance signal and at least one chrominance signal comprising means for developing luminance samples in response to said luminance signal, means for developing chrominance samples in response to said chrominance signal, color processing means having a signal input, an output and a control input, means for coupling said chrominance samples to said signal input, and means responsive to said luminance samples for developing energizing signals at said control input.

2. A video encoder as defined in claim 1 wherein said means for developing energizing signals includes means for developing a difference signal in response to successive samples of said luminance samples, and threshold means responsive to said difference signal for developing an energizing signal when said difference signal is greater than a threshold level.

3. A video encoder as defined in claim 2 wherein said means for developing a difference signal includes means for delaying a luminance sample for at least one sample interval, and a subtraction circuit having one input connected to receive a sample at the output of said delay means and a second input connected to receive a sample at the input of said delay means.

4. A video encoder as defined in claim 1 wherein said color processing means includes an accumulator circuit having an input, a reset input and an output, means for coupling said chrominance samples to the input of said accumulator circuit, means for coupling said energizing signals to the reset input of said accumulator circuit, means for counting the number of chrominance samples between successive energizing signals, and means for dividing the value available at the output of said accumulator circuit by the number of samples counted by said means for counting.

5. A video encoder as defined in claim 4 wherein said color processing means further includes buffer memory means having its input connected to receive a value developed by said means for dividing in response to the presence of an energizing signal from said means responsive to said luminance samples.

6. Apparatus for encoding at least one chrominance signal which provides color information for a scene represented by a luminance signal, said apparatus comprising color processing means having a signal input, an output, and a control input, means for coupling said chrominance signal to said signal input, means responsive to said luminance signal for developing an energizing signal when a change in said luminance signal exceeds a predetermined threshold level, and means for coupling said energizing signal to said control input.

7. The apparatus as defined in claim 6 wherein said means for developing an energizing signal includes means for developing a difference signal in response to said luminance signal, and threshold means for developing an energizing signal when said difference signal exceeds a threshold level.

8. Apparatus as defined in claim 7 wherein said means for developing a difference signal includes delay means having an input and an output for providing a delay equivalent to the interval between adjacent picture elements in said luminance signal, and a subtraction circuit having one input connected to the output of said delay means and a second input connected to the input of said delay means.

9. Apparatus as defined in claim 6 wherein said color processing means includes a first accumulator circuit having an input coupled to receive said chrominance signal and a reset input coupled to receive said energizing signal, a second accumulator circuit having a reset input coupled to receive said energizing signal and an output which provides a value to indicate a time interval between adjacent energizing signals at its reset input, and a divider means having one input coupled to receive a value developed by said first accumulator means and a second input coupled to receive an output developed by said second accumulator means.

10. Apparatus as defined in claim 9 wherein said color processing means further includes a buffer memory means having its input coupled to store an output developed by said divider means in response to said energizing signal.

11. The method of processing a chrominance signal which represents color information in a scene corresponding to a luminance signal comprising the steps of selecting the instants when significant transitions take place in said luminance signal, developing a single value to represent said chrominance signal between successive significant transitions in said luminance signal, and transmitting only said single value to represent the color information corresponding to said chrominance signal during the interval between said successive signficant transitions.

12. The method of processing a chrominance signal as defined in claim 11 wherein the step of developing a single value to represent said chrominance signal includes the steps of developing samples of said chrominance signal, accumulating said samples for the intervals between said successive significant transitions in said luminance signal, and dividing the sum obtained by said accumulating by a value representing the interval between said successive significant transitions.

* * * * *